(12) United States Patent
Huang et al.

(10) Patent No.: US 6,515,670 B1
(45) Date of Patent: Feb. 4, 2003

(54) GRAPHICS SYSTEM AND METHOD FOR MINIMIZING THE IDLE TIME OF A HOST PROCESSOR IN THE GRAPHICS SYSTEM

(75) Inventors: Ta-lun Huang, Hsin-Chu (TW); Chung-yen Lu, Hsin-Chu (TW)

(73) Assignee: Silicon Integrated Systems Corp. (TW)

(*) Notice: Subject to any disclaimer, the term of this patent is extended or adjusted under 35 U.S.C. 154(b) by 0 days.

(21) Appl. No.: 09/458,078

(22) Filed: Dec. 10, 1999

(51) Int. Cl.[7] ............................................... G06T 1/00
(52) U.S. Cl. ........................ 345/503; 345/520; 345/522; 345/558
(58) Field of Search ................................. 345/522, 501, 345/503, 520, 558, 545, 572, 559

(56) References Cited

U.S. PATENT DOCUMENTS 5,657,479 A * 8/1997 Shaw et al. ............... 345/522
5,796,413 A * 8/1998 Shipp et al. ............... 345/522
5,844,576 A * 12/1998 Wilde et al. ............... 345/501
5,917,505 A * 6/1999 Larson ....................... 345/501
5,966,142 A * 10/1999 Harkin ....................... 345/520

* cited by examiner

Primary Examiner—Kee M. Tung

(57) ABSTRACT

A graphics system minimizes the idle time of a host processor while sending a large amount of graphics instructions in a graphics system. The graphics system includes a host processor, a system memory, a graphics memory and a graphics accelerating device (GAD) that interconnects the host processor and the graphics memory. The host processor divides the graphics instructions into graphics commands and graphics data and temporarily stores the graphics data in the system memory. The GAD receives the graphics commands coming from the host processor and receives the graphics data coming from the system memory, respectively, and sends the processed outcome to the graphics memory. Due to the graphics data being temporarily stored in the system memory, the host processor will not be idle even though many consecutive 3D graphics instructions are sent from the host processor to the GAD.

17 Claims, 7 Drawing Sheets

GRAPHICS SYSTEM AND METHOD FOR MINIMIZING THE IDLE TIME OF A HOST PROCESSOR IN THE GRAPHICS SYSTEM

BACKGROUND OF THE INVENTION (a) Field of the Invention

This invention relates to a graphics system and to a method for minimizing the idle time of a host processor in the graphics system.

(b) Background of the Invention

Graphics accelerating devices (GAD) employed in graphics systems become more and more popular in personal computer applications, due to the rapid growth of the multimedia market and recent developments in VLSI technology. A conventional graphics system is illustrated in FIG. 1.

The conventional graphics system comprises a host processor 10, a system memory 20, a graphics memory 30 and a GAD 40'. The GAD 40' interconnects the host processor 10 and the graphics memory 30 via a system bus 50 and a memory bus 60, and acts as a coprocessor to help the host processor 10 execute the graphics instructions. It is noted that the host processor 10 in a PC system is generally referred as the central processing unit (CPU). While the GAD 40' receives a graphics instruction sent from the host processor 10, the GAD 40' fetches some specified graphics data, such as texture data, from the system memory 20 and executes the graphics instruction. After the performance of the graphics instructions, the graphics memory 30 receives and stores the outcome generated by the GAD 40'.

The GAD 40' includes a buffer device (queue) and a graphics engine. The queue is used as a storage device for storing instructions received from the host processor 10 via the system bus 50. The graphics engine is a graphics processor for receiving and executing the instructions stored in the queue. It accesses the graphics memory 30 via the memory bus 60 to store the outcome of graphics processing. Generally, the graphics memory 30 is a dynamic random access memory or a video random access memory.

However, due to the application of 3D graphics in a graphics system, a large amount of graphics data transferring occurs frequently between the host processor 10 and the GAD 40' in a graphics system. While a large amount of graphics data are transferred, the queue tends to be filled and the host processor 10 will be idle for awaiting available spaces of the queue. The host processor 10 is not idle only if the size of the queue is large enough. However, increasing the total capacity of the queue will necessitate the circuitry of the GAD 40' of the graphics system becoming complicated, thereby increasing the manufacturing cost.

SUMMARY OF THE INVENTION

Accordingly, it is an object of the present invention to provide a graphics system which sends graphics instructions to a graphics accelerating device by two ways to minimize the idle time of a host processor.

It is another object of the present invention to provide a method for minimizing the idle time of a host processor in the graphics system.

To achieve the above objects, in accordance with an preferred embodiment of the present invention, a graphics system is provided which comprises a host processor which generates graphics instructions and divides the graphics instructions into graphics commands and graphics data; a system memory which is used as a storage device; a graphics acceleration device which executes the graphics instructions received from the host processor; a graphics memory which is used as a storage device for storing graphics data processed by the graphics acceleration device; a system bus for transferring signals among the host processor, the system memory and the graphics acceleration device; and a memory bus for transferring signals among the graphics acceleration device and the graphics memory.

The graphics command is directly sent from the host processor to GAD via the system bus. On the other hand, the graphics data are stored in system memory temporarily. After the graphics command is received and executed by GAD, the related graphics data are sent from the system memory to the GAD via the system bus.

Therefore, the GAD handles the flows of graphics command and graphics data and performs the graphics instructions. The GAD comprises a graphics engine, a command master, and a data master. The graphics engine is a device which performs the operations of graphics instructions. In addition, it generates and handles the graphics data, which will be sent to the graphics memory via the memory bus. The command master provides buffer for the graphics commands received from the host processor. The data master receives request signals from the graphics engine, handshakes with a system bus controller, grabs the graphics data from the system memory and provides buffer for these data.

The method for reducing the idle time of a host processor in a graphics system according to present invention, comprising the steps of:

step 1: a host processor divides graphics instructions into graphics commands and graphics data;

step 2: the host processor sends the graphics command to a command master via a system bus;

step 3: the host processor sends the graphics data to a system memory;

step 4: a data master receives the graphics data from the system memory via the system bus;

step 5: a graphics engine receives the graphics command and the graphics data from the command master and the data master, respectively;

step 6: the graphics engine performs the graphics instructions and sends the processed outcome to a graphics memory for further display.

Other objects, features and advantages of the present invention will become apparent from the following detailed description when taken in conjunction with the accompanying drawings.

BRIEF DESCRIPTION OF THE DRAWINGS

The accompanying drawings which are incorporated in and form a part of this specification illustrate an embodiment of the invention and, together with the description, serve to explain the principles of the invention.

DETAILED DESCRIPTION OF THE INVENTION

Figure 1:
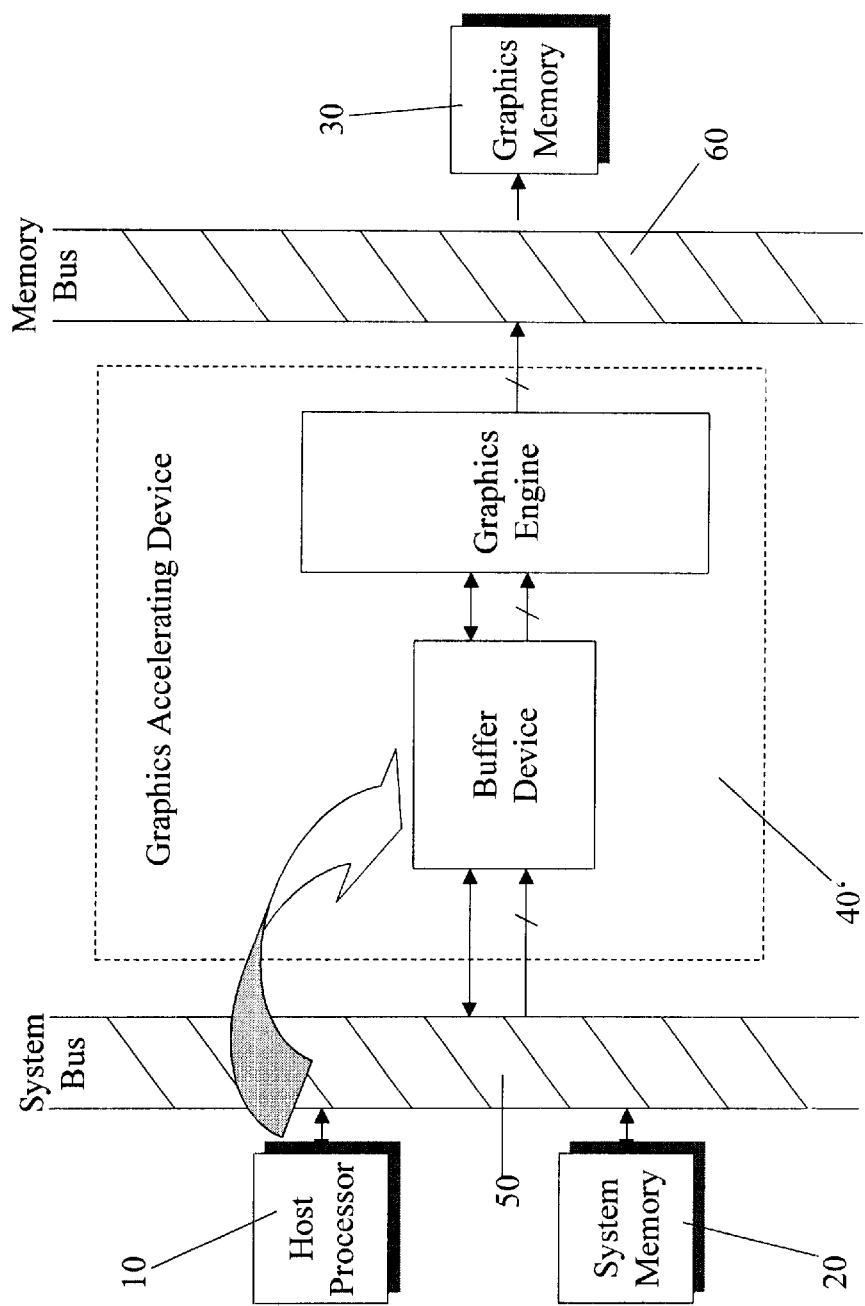
FIG. 1 is a simplified block diagram of a prior art graphics system.
Figure 2:
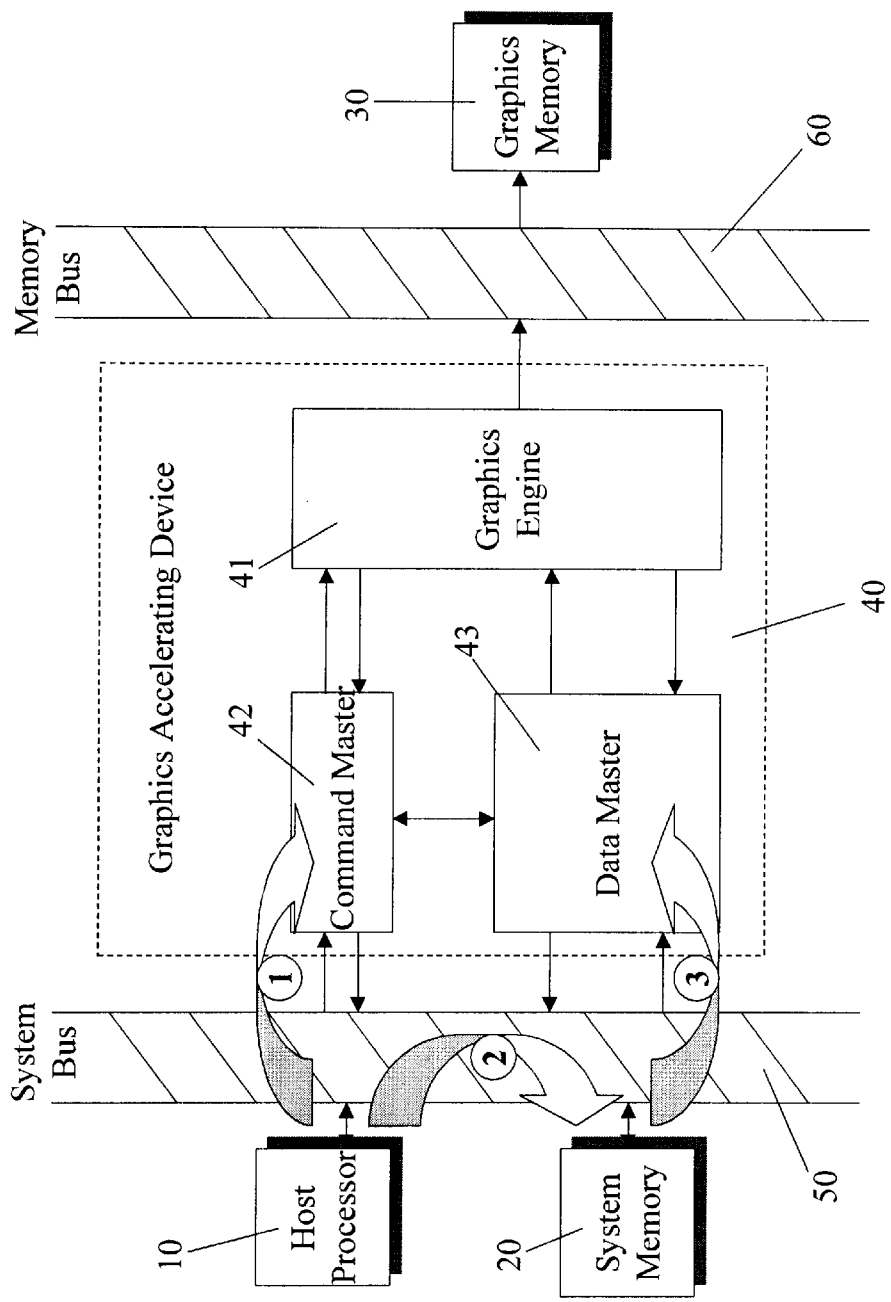
FIG. 2 is a block diagram of a graphics system according to the present invention.

Referring to FIG. 2, it shows the block diagram of a graphics system according to the present invention. The graphics system comprises a host processor 10, a system memory 20, a graphics memory 30 and a graphics accelerating device (GAD) 40. The GAD 40 interconnects the host processor 10, the system memory 20 and the graphics memory 30 via a system bus 50 and a memory bus 60.

The GAD 40 comprises a graphics engine 41, a command master 42 and a data master 43. The graphics engine 41 may be a graphics processing device, which performs the graphics instructions received from the host processor 10. Graphics instructions may be any kind of operations, such as rendering, transforming, and lighting, and the like, and are divided into graphics commands and graphics data by the host processor 10. The graphics commands are directly sent from the host processor 10 to the graphics engine 41 via the system bus 50. On the other hand, the graphics data are sent from the host processor 10 to the graphics engine 41 via two stages. First, the graphics data are sent from the host processor 10 to the system memory 20. Second, the data master 43 fetches the graphics data from the system memory 20 for later processing. While the graphics engine 41 has received a graphics command and graphics data from the command master 42 and the data master 43, it performs the graphics instruction, and stores the outcome in the graphics memory 30.

Figure 3:
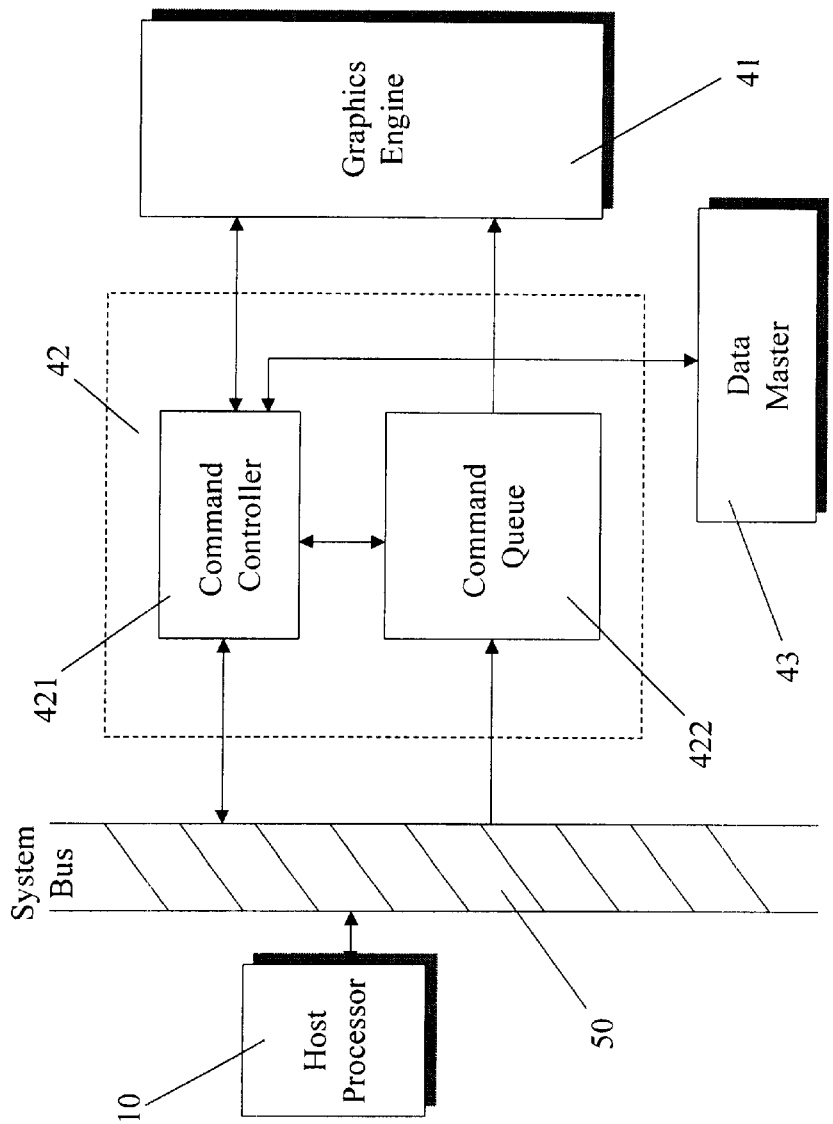
FIG. 3 is a block diagram of the command master shown in FIG. 2.

Referring to FIG. 3, it shows the block diagram of the command master 42 in the graphics system according to the present invention. The command master 42 includes a command controller 421 and a command queue 422. The command controller 421 controls the operation of the command queue 422 and communicates with a system bus controller (not shown) and the graphics engine 41. Besides, it informs the data master 43 of the address of graphics data stored in the system memory 20. The command queue 422 is used as a storage device, which stores the graphics command coming from the host processor 10 via the system bus 20.

Figure 4:
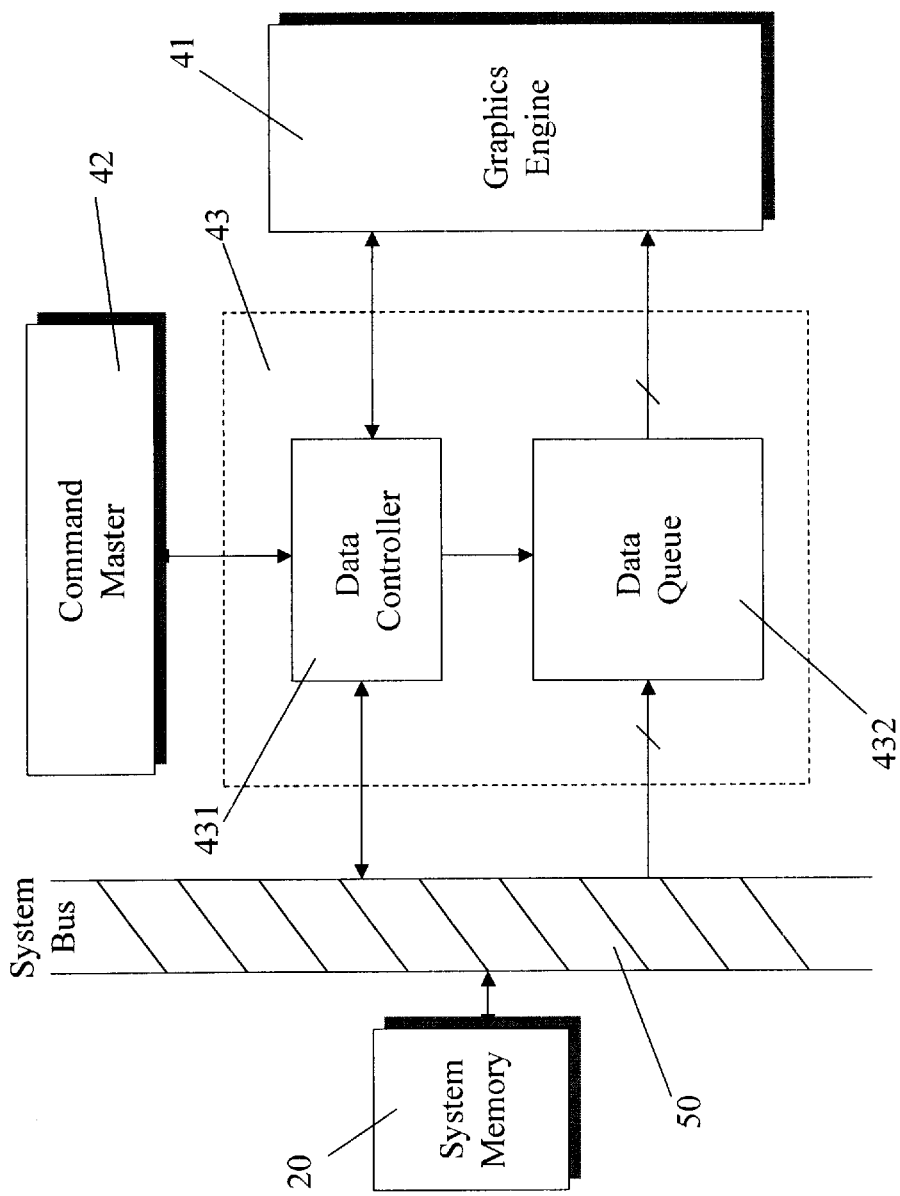
FIG. 4 is a block diagram of the data master shown in FIG. 2

Referring to FIG. 4, it shows the block diagram of the data master 43 in the graphics system according to the present invention. The data master 43 includes a data controller 431 and a data queue 432. The data controller 431 controls the operation of the data queue 432 and communicates with a system bus controller (not shown) and the graphics engine 41. The data queue 432 stores the graphics data coming from the system memory 20 via the system bus 50.

Figure 5:
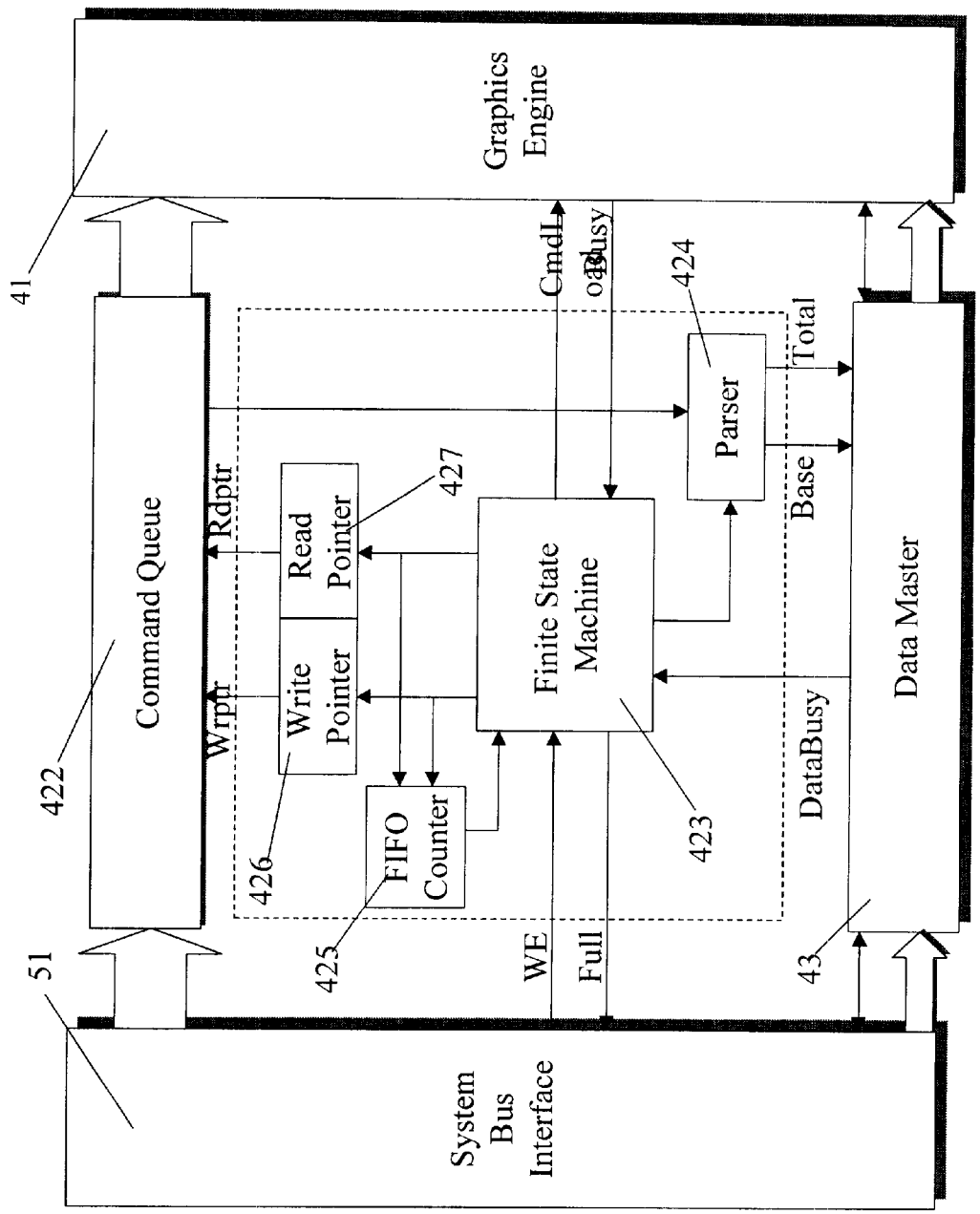
FIG. 5 is a block diagram of the command controller of one preferred embodiment of the present invention.

Referring to FIG. 5, it shows the block diagram of the command controller 421 in the command master 42 according to the present invention. The command controller 421 comprises a finite state machine 423, a parser 424, a FIFO counter 425, a write pointer 426 and a read pointer 427. The finite state machine 423 acts as a kernel controller to handle the state of the command controller 421. The parser 424 receives a part of graphics command from the command queue 422, extracts the information of the base address and total number of graphics data and sends both to the data master 43. The write pointer 426 specifies where the host processor 10 writes the graphics commands into the command queue 422. The read pointer 427 specifies where the graphics engine 41 reads the graphics commands from the command queue 422. The FIFO counter 425 computes the occupied units of the command queue 422. If the number of occupied units is zero, the command queue 422 is empty. The finite state machine 423 receives signals from the data master 43, the system bus interface 51 and the graphics engine 41. It also sends handshaking signals to the system bus interface 51 and the graphics engine 41 for performing the graphics command transferring.

WE and Full signals are used to control the communication between the command controller 421 and the system bus interface 51. The command controller 421 sends the Full signal to inform the system bus interface 51 of stopping sending graphics commands. If the command queue 422 is not full, the system bus interface 51 writes graphics commands into the command queue 422 and informs the command controller 421 at the same time by the WE signal.

CmdLoad and Busy signals are used to control the communication between the command controller 421 and the graphics engine 41. The graphics engine 41 sends the Busy signal to inform the command controller 421 of stopping sending graphics commands. If the graphics engine 41 is not busy and the command queue 422 is not empty, the command controller 421 transfers graphics command from the command queue 422 to the graphics engine 41, and informs the graphics engine 41 at the same time by the CmdLoad signal.

The command controller 421 sends Base and Total signals to inform the data master 43 of the address of the system memory 20 where the graphics data are stored. The Base signal is the base address of the system memory 20 and the Total signal represents the total number of the relative graphics data.

Figure 6:
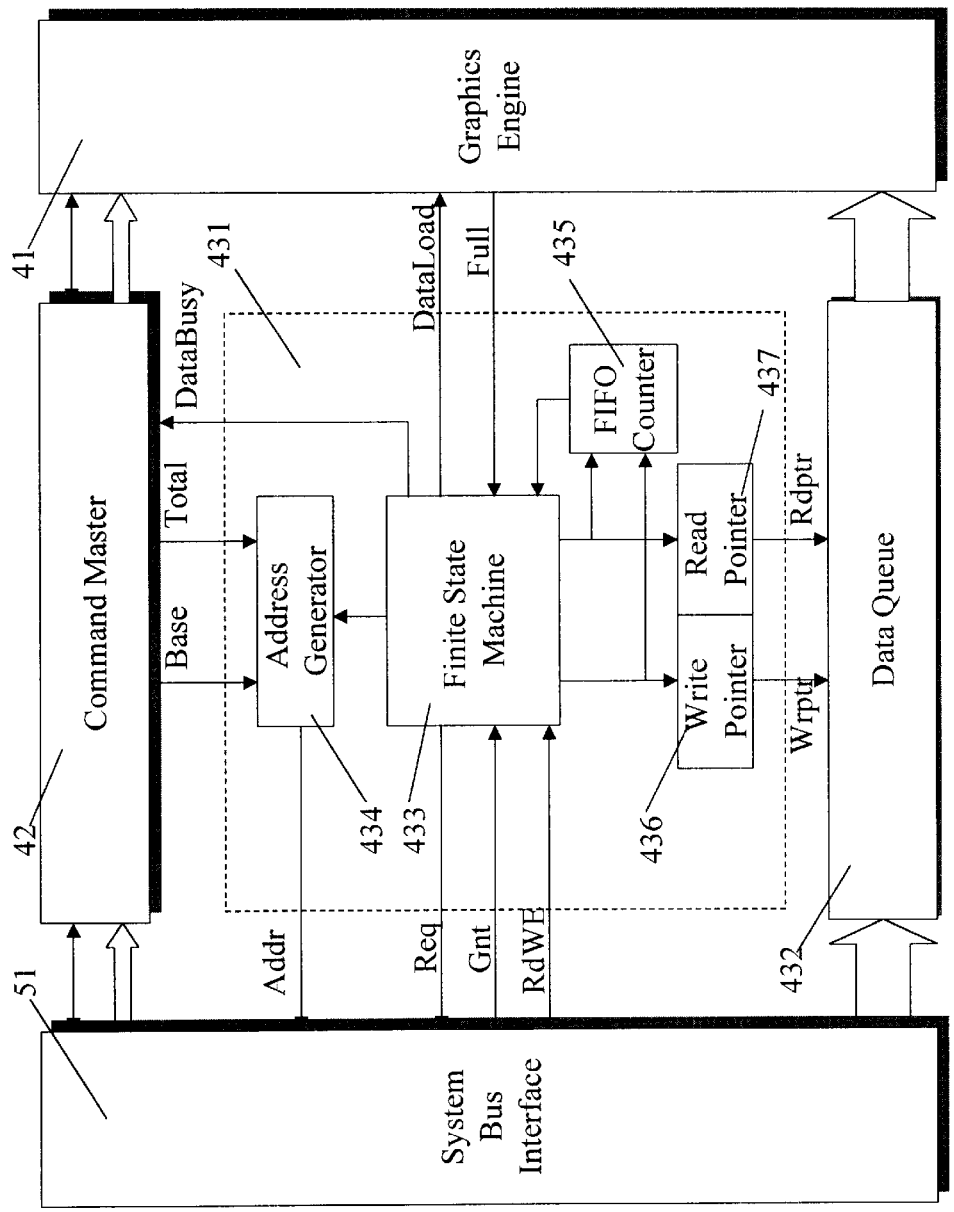
FIG. 6 is a block diagram of the data controller of one preferred embodiment of the present invention.

The command controller 421 uses Wrptr and Rdptr signals to specify the locations of graphics commands in the command queue 422. The Wrptr and Rdptr signals are generated by the write pointer 426 and the read pointer 427, respectively. The Wrptr signal indicates where the system bus interface 51 writes graphics commands into the command queue 422 and the Rdprt signal indicates where the graphics engine 41 reads graphics commands from the command queue 422. Referring to FIG. 6, it shows the block diagram of the data controller 431 in the data master 43 according to the present invention. The data controller 431 comprises an address generator 434, a finite state machine 433, a FIFO counter 435, a write pointer 436 and a read pointer 437. The address generator 434 receives the base address and the total number of graphics data from the command master 421 and generates the address of the system memory 20 to indicate where the data controller 431 reads the graphics data from the system memory 20. The finite state machine 433 acts as a kernel controller to handle the state of the data controller 431. The write pointer 436 specifies the location where the system bus interface 51 writes the graphics data into the data queue 432. The read pointer 437 specifies the location where the graphics engine 41 reads the graphics data from the data queue 432. The FIFO counter 435 computes the occupied units in data queue 432. If the number of occupied units is zero, it means the data queue 432 is empty. The finite state machine 433 receives signals from the command master 42, the system bus interface 51 and the graphics engine 41. It sends handshaking signals to the system bus interface 51 and the graphics engine 41 for performing the graphics data transferring.

Addr, Req, Gnt and RdWE signals are used to control the communication between the data controller 431 and the system bus interface 51. The data controller 431 sends the Req signal to ask the system bus interface 51 to provide graphics data. The location of the graphics data is specified by the Addr signal generated by address generator 434. Later, the system bus interface 51 replies to data controller 431 with the Gnt signal, which means the graphics data are ready to be downloaded into the data queue 432. The system bus interface 51 starts sending graphics data from the system memory 20 to the data queue 432 and at the same time sends the RdWE signal to the data controller 431.

DataLoad and Full signals are used to control the communication between the data controller 431 and the graphics engine 41. The graphics engine 41 sends the Full signal to inform the data controller 431 of stopping sending graphics data. If the buffer of the graphics engine 41 is not full and the data queue 432 is not empty, the data controller 431 transfers graphics data from the data queue 432 to the graphics engine 41, and informs the graphics engine 41 at the same time by the DataLoad signal.

Wrptr and Rdptr Signals are used for the data controller 431 to specify the locations of graphics data in the data queue 432. The Wrptr and Rdptr signals are generated by the write pointer 436 and the read pointer 437, respectively. The Wrptr signal indicates where the system bus interface 51 writes the graphics data into the data queue 432 and the Rdptr signal indicates where the graphics engine 41 reads the graphics data from the data queue 432.

The command master 42 use a DataBusy signal to communicate with the data master 43. The DataBusy signal indicates whether the graphics data are being transferred. The DataBusy signal is asserted when the data is being transferred and is deasserted when the data transfer is completed.

Figure 7:
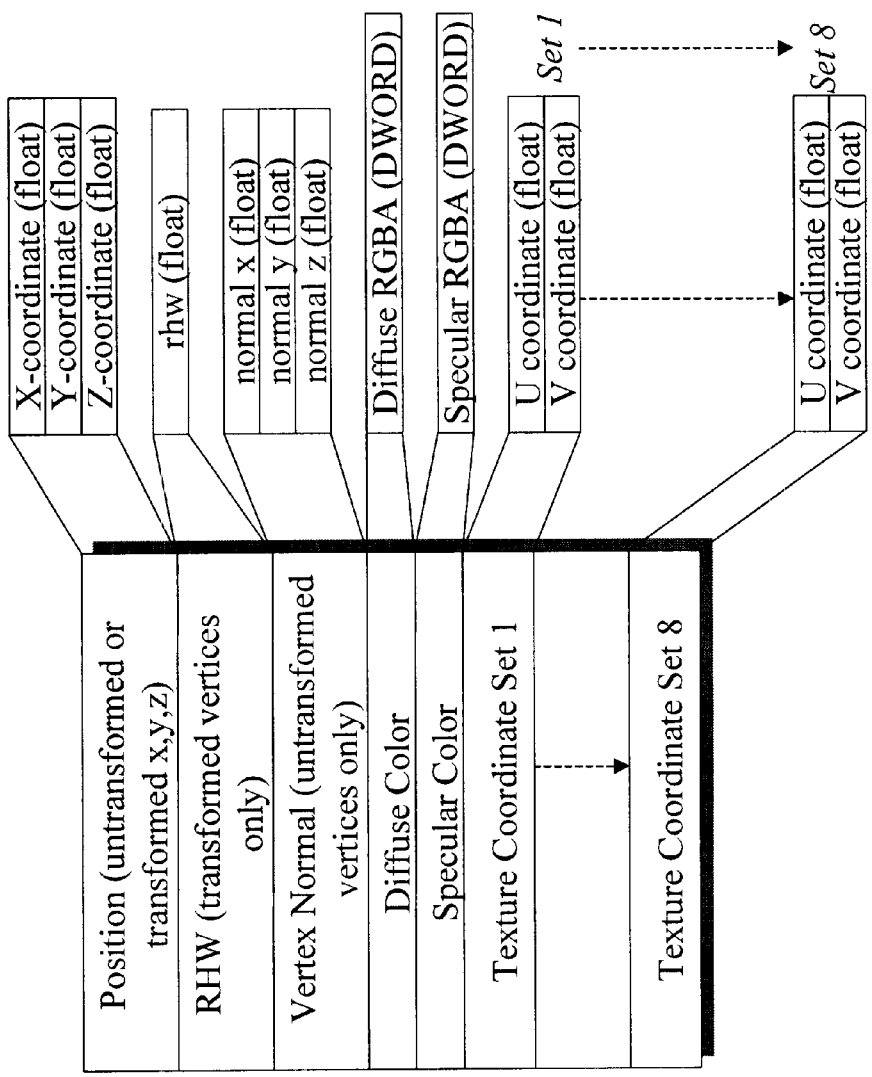
FIG. 7 illustrates the vertex format which is used as an example of graphics data.

FIG. 7 shows an example of a vertex data format for 3D graphics data. The vertex data format comprises x, y, z coordinate values, w value, normal vector, diffuse color values, specular color values, and texture coordinates. There are many vertex data in defining a 3D objects. That is, more than one vertex data are applied within a graphics instruction. If many consecutive 3D graphics instructions are sent from the host processor to a prior art GAD, the buffer in the GAD will soon be filled and the processor will be idle for awaiting available spaces of the buffer. On the other hand, the graphics system according to the present invention employs a host processor to divide the graphics instructions into graphics commands and graphics data and temporarily stores the graphics data in the system memory. Due to the graphics data is temporarily stored in the system memory, the host processor will not be idle even though many consecutive 3D graphics instructions are sent from the host processor to the GAD.

What is claimed is:

1. A graphics system, comprising:
    a host processor which generates graphics instructions and divides each of the graphics instructions into a graphics command and graphics data;
    a system memory which is used as a storage device for storing the graphics data coming from said host processor;
    a graphics acceleration device which receives the graphics commands and the graphics data from said host processor and said system memory, respectively, and performs the graphics instructions, said graphics acceleration device including:
        a graphics engine which performs said graphics instructions;
        a command master which controls the transferring flow of the graphics commands between said host processor and said graphics engine via said system bus; and
        a data master which controls the transferring flow of the graphics data between said system memory and said graphics engine via said system bus;
    a graphics memory which is used as a storage device for storing graphics outcome processed by said graphics acceleration device;
    a system bus for transferring signals among said host processor, said system memory and said graphics acceleration device;
    a memory bus for transferring signals between said graphics acceleration device and said graphics memory.

2. The graphics system of claim 1, wherein said command master comprises:
    a command controller for controlling operations of said command master; and
    a command queue for temporarily storing the graphics commands.

3. The graphics system of claim 2, wherein said command controller comprises:
    a finite state machine for controlling the states of said command controller;
    a parser used to generate a base address and the number of the graphics data according to the graphics command;
    a FIFO counter used to compute the amount of the graphics commands stored in said command queue;
    a write pointer used to indicate where the graphics commands are written into said command queue; and
    a read pointer used to indicate where said graphics engine reads the graphics commands from said command queue.

4. The graphics system of claim 2, wherein said command queue is a command register.

5. The graphics system of claim 2, wherein said command queue is a FIFO unit.

6. The graphics system of claim 2, wherein said command queue is a reserved space in said graphics memory.

7. The graphics system of claim 2, wherein said command queue is a combination of a FIFO unit with a reserved space in said graphics memory.

8. The graphics system of claim 1, wherein said data master comprises:
    a data controller for controlling operations of said data master; and
    and a data queue for temporarily storing the graphics data.

9. The graphics system of claim 8, wherein said data controller comprises:
    an address generator used to generate the address of graphics data stored in said system memory;
    a finite state machine for controlling the states of said data controller;
    a FIFO counter used to compute the amount of the graphics data stored in said data queue;
    a write pointer used to indicate where the graphics data are wrote into said data queue; and
    a read pointer used to indicate where said graphics engine reads the graphics data from said data queue.

10. The graphics system of claim 8, wherein said data queue is a command register.

11. The graphics system of claim 8, wherein said data queue is a FIFO unit.

12. The graphics system of claim 8, wherein said data queue is a reserved space in said graphics memory.

13. The graphics system of claim 8, wherein said data queue is a combination of a FIFO unit with a reserved space in said graphics memory.

14. A method for minimizing idle time of a host processor in a graphics system, said graphics system comprising a system memory, a graphics memory, and a graphics accelerating device interconnecting said host processor, said system memory, and said graphics memory, said graphics accelerating device having a command master, a data master and a graphics engine, the method comprising the steps of:

step 1: dividing graphics instructions into graphics commands and graphics data by said host processor;

step 2: sending the graphics commands from said host processor to said command master via said system bus;

step 3: sending the graphics data from said host processor to said system memory via said system bus;

step 4: sending the graphics data from said system memory to said data master via said system bus;

step 5: receiving the graphics command and graphics data by said graphics engine from said command master and said data master, respectively;

step 6: performing the graphics command with graphics data by said graphics engine and sending processed outcome to said graphics memory for further display.

15. A graphics acceleration device for processing graphics instructions in a graphics system, said graphics system comprising a host processor which generates graphics instructions and divides the graphics instructions into graphics commands and graphics data, a system memory which is used to store the graphics data, and a graphics memory, said graphics acceleration device comprising:

a graphics engine which executes said graphics instructions;

a command master which controls the transferring flow of the graphics commands between said host processor and said graphics engine via a system bus, said command master comprising a command controller for controlling operations of said command master and a command queue for temporarily storing the graphics commands; and a data master which controls the transferring flow of the graphics data between said system memory and said graphics engine via said system bus, said data master comprising a data controller for controlling operations of said data master and a data queue for temporarily storing the graphics data.

16. The graphics system of claim 15, wherein said command controller comprises:

a finite state machine for controlling the states of said command controller;

a parser used to generate a base address and the number of the graphics data according to the graphics command transferred from said command queue;

a FIFO counter used to compute the amount of the graphics commands stored in said command queue;

a write pointer used to indicate where the graphics commands are wrote into said command queue;

a read pointer used to indicate where said graphics engine reads the graphics commands from said command queue.

17. The graphics system of claim 15, wherein said data controller comprises:

an address generator used to generate the address of graphics data stored in said system memory;

a finite state machine for controlling the states of said data controller;

a FIFO counter used to compute the amount of the graphics data stored in said data queue;

a write pointer used to indicate where the graphics data are wrote into said data queue; and a read pointer used to indicate where said graphics engine reads the graphics data from said data queue.

\* \* \* \* \*